(12) United States Patent
Kohlman et al.

(10) Patent No.: US 7,672,120 B2
(45) Date of Patent: Mar. 2, 2010

(54) INTERCHANGEABLE KEYBOARD FOR COMPUTER SYSTEMS

(75) Inventors: Ed H. Kohlman, Tigard, OR (US);
Hong W. Wong, Portland, OR (US);
Daryl J. Nelson, Beaverton, OR (US);
Wah Yiu Kwong, Beaverton, OR (US);
George H. Daskalakis, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 11/394,613

(22) Filed: Mar. 31, 2006

(65) Prior Publication Data
US 2007/0236459 A1 Oct. 11, 2007

(51) Int. Cl.
*G06F 1/16* (2006.01)
(52) U.S. Cl. .............. 361/679.17; 312/223.1; 312/223.2; 400/691; 400/692
(58) Field of Classification Search ............. 361/679.17
See application file for complete search history.

(56) References Cited

U.S. PATENT DOCUMENTS

| | | | |
|---|---|---|---|
| 4,065,199 A * | 12/1977 | Andre et al. ............... 439/498 |
| 5,130,499 A * | 7/1992 | Dijkshoorn ................ 174/254 |
| 5,175,398 A * | 12/1992 | Hofmann .................. 174/169 |
| 5,281,765 A * | 1/1994 | Iura et al. ................ 174/117 F |
| 5,331,508 A * | 7/1994 | Hosoi et al. ............. 361/679.09 |
| 5,510,953 A * | 4/1996 | Merkel .................. 361/679.08 |
| 5,519,570 A * | 5/1996 | Chung .................. 361/679.17 |
| 5,546,334 A * | 8/1996 | Hsieh et al. ............... 708/141 |
| 5,654,701 A * | 8/1997 | Liao et al. .................. 341/22 |
| 5,774,329 A * | 6/1998 | Kuo .................. 361/679.17 |
| 6,064,564 A * | 5/2000 | Song et al. ............ 361/679.09 |
| 6,104,604 A * | 8/2000 | Anderson et al. ...... 361/679.55 |
| 6,194,664 B1* | 2/2001 | Zamora et al. ........... 174/117 F |
| 6,212,066 B1* | 4/2001 | Fetterman ............. 361/679.17 |
| 6,262,883 B1* | 7/2001 | Kim ..................... 361/679.09 |
| 6,317,061 B1* | 11/2001 | Batra et al. ................ 341/22 |
| 6,510,048 B2* | 1/2003 | Rubenson et al. ...... 361/679.09 |
| 6,595,786 B2* | 7/2003 | Horiuchi et al. ............... 439/74 |
| 6,702,607 B2* | 3/2004 | Kondo .................... 439/498 |
| 6,914,197 B2* | 7/2005 | Doherty et al. ............ 174/254 |
| 6,972,699 B2* | 12/2005 | Olodort et al. ............... 341/22 |

(Continued)

OTHER PUBLICATIONS

"Replacing the Solo 5350 Keyboard", 7 pages, http://support.gateway.com/s/Mobile/Solo_Series/p5350/8508369/8508369.htm.

(Continued)

*Primary Examiner*—Jayprakash N Gandhi
*Assistant Examiner*—Anthony Q Edwards
(74) *Attorney, Agent, or Firm*—Schwabe, Williamson & Wyatt, P.C.

(57) ABSTRACT

A keyboard is to be designed as a standardized keyboard having a certain length, width and thickness. The keyboard may be used interchangeably among different mobile computer systems. A keyboard cable associated with the keyboard may be designed such that it can accommodate an interface connector at any location relative to a bottom end of the keyboard. One or more control devices may also be used in conjunction with the keyboard. The control device may be designed with standardized dimensions, electrical interface, interface connector and cable length to enable it to accompany the keyboard among the different mobile computer systems.

16 Claims, 10 Drawing Sheets

U.S. PATENT DOCUMENTS

| | | | |
|---|---|---|---|
| 7,091,953 B1 * | 8/2006 | Kramer | 345/168 |
| 7,495,893 B2 * | 2/2009 | Choi | 439/248 |
| 2001/0028549 A1 * | 10/2001 | Suganuma et al. | 361/683 |
| 2002/0085338 A1 * | 7/2002 | Lin | 361/680 |
| 2004/0012509 A1 * | 1/2004 | Chen | 341/22 |
| 2004/0233626 A1 * | 11/2004 | Chang et al. | 361/683 |
| 2005/0162821 A1 * | 7/2005 | Homer et al. | 361/683 |
| 2005/0231485 A1 * | 10/2005 | Jones et al. | 345/168 |
| 2006/0152484 A1 * | 7/2006 | Rolus Borgward | 345/157 |
| 2007/0102514 A1 * | 5/2007 | Weisblatt et al. | 235/383 |

OTHER PUBLICATIONS

"Replacing the Gateway 600 Keyboard", 10 pages, www.gateway.com.

"Keyboard Replacment Instructions", 8 pages, iBook G4 (Mid 2005), 073-1000 Rev. A.

"Keyboard Assembly", 3 pages.

* cited by examiner

INTERCHANGEABLE KEYBOARD FOR COMPUTER SYSTEMS

FIELD OF INVENTION

The present invention relates generally to the field of computer design, and more specifically, to techniques for making keyboards for computer systems interchangeable.

BACKGROUND

Keyboards used in mobile computer systems do not have the same flexibility as keyboards used in non-mobile computer systems. Users of non-mobile computer systems have many keyboard replacement options to choose at relatively low costs. The same cannot be said for users of mobile computer systems. One reason for this is the fact that mobile computer systems have many form factors regardless whether they are manufactured by the same computer manufacturer or by different computer manufacturers. A keyboard used for a mobile computer system having one form factor may not be used for a mobile computer system having another form factor.

Adding to this problem is the fact that placement of keyboard cable in a mobile computer system many vary depending on the keyboard. The cable must be mounted within a limited zone on the system board as dictated by the location of the interface connector. Typically, a flex keyboard cable with a single connector is used. Because of these limitations, the cost of replacing a keyboard in a mobile computer system remains high. Quite often, repairing a keyboard in mobile computer system costs more than purchasing a new keyboard for a non-mobile computer system. Typically, a custom keyboard (which they all are today) is air mailed to the customer for replacement and repair.

BRIEF DESCRIPTION OF THE DRAWINGS

The present invention is illustrated by way of example and not limitation in the accompanying figures in which like references indicate similar elements and in which:

FIGS. 4A-4D illustrate an example of a control device, in accordance with some embodiments.

FIGS. 6A-6B illustrate an example of one implementation of an improved keyboard cable, in accordance with some embodiments.

FIGS. 6C-6F illustrate an example of another implementation of an improved keyboard cable, in accordance with some embodiments.

DETAILED DESCRIPTION

For some embodiments, a keyboard may be designed to accommodate keyboard bays from different computer manufacturers. The keyboard may include a keyboard cable having multiple connection ends.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Computer System

Figure 1:
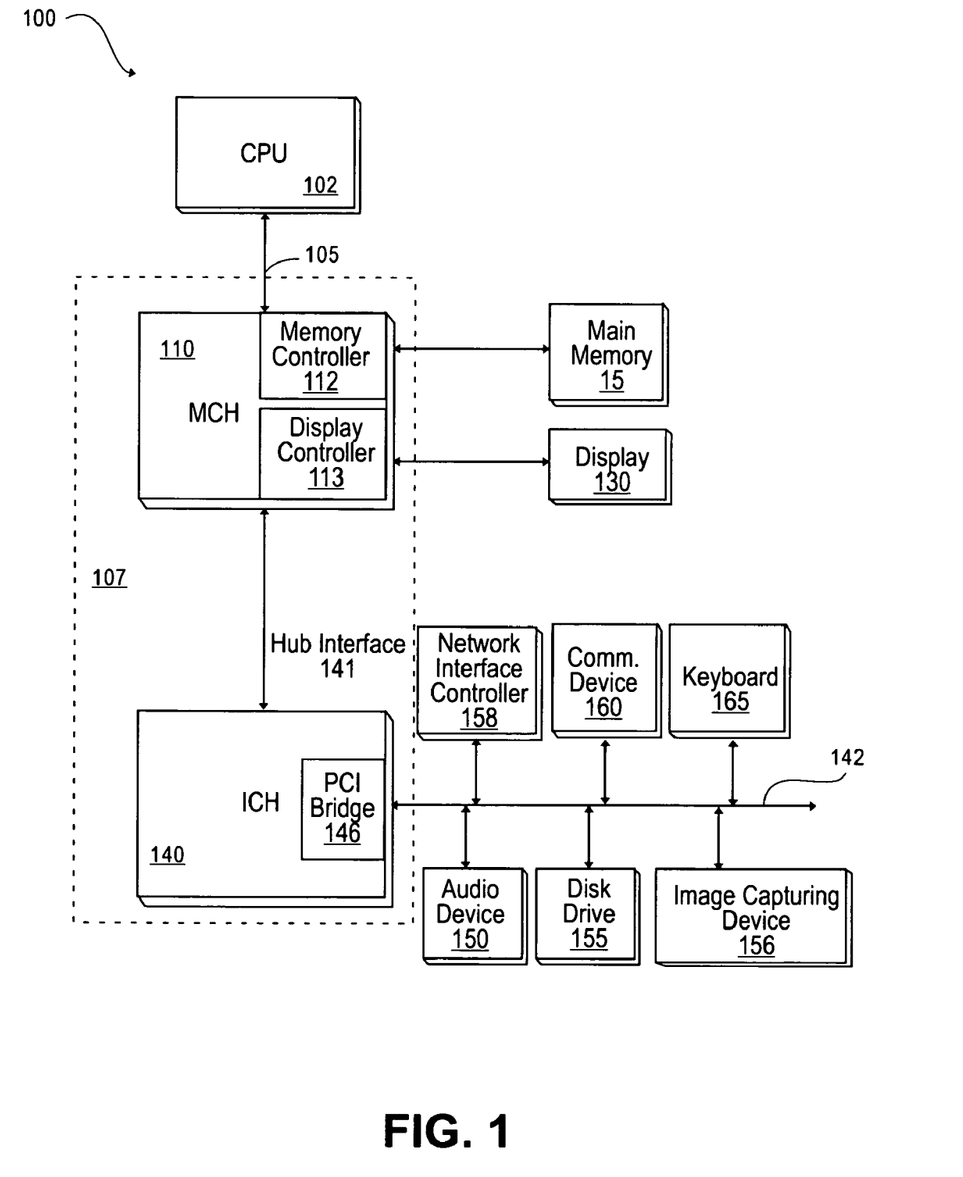
FIG. 1 is a block diagram illustrating an example of a computer system, in accordance with some embodiments.

FIG. 1 is a block diagram illustrating an example of a computer system, in accordance with some embodiments. Computer system 100 may be a mobile computer system. Computer system 100 may include a central processing unit (CPU) 102 and may receive its power from an electrical outlet, a battery (not shown), or any other power sources. The CPU 102 and chipset 107 may be coupled to bus 105. The chipset 107 may include a memory control hub (MCH) 110. The MCH 110 may include a memory controller 112 that is coupled to memory 115. The memory 115 may store data and sequences of instructions that are executed by the CPU 102 or any other processing devices included in the computer system 100. The MCH 110 may include a display controller 113. Display 130 may be coupled to the display controller 113. The chipset 107 may also include an input/output control hub (ICH) 140. The ICH 140 may be coupled with the MCH 110 via a hub interface 141. The ICH 140 may provide an interface to peripheral devices within the computer system 100. The ICH 140 may include PCI bridge 146 that provides an interface to PCI bus 142. The PCI bridge 146 may provide a data path between the CPU 102 and the peripheral devices. In this example, an audio device 150, a disk drive 155, communication device 160, a keyboard 165, and network interface controller 158 may be connected to the PCI bus 142. The disk drive 155 may include a storage media to store data and sequences of instructions that are executed by the CPU 102 or any other processing devices included in the computer system 100.

Keyboard 165 may also be connected to the PCI bus 142. Although not shown, the computer system 100 may also include a keyboard controller to process information generated by the keyboard 165. For example, the information may include scan codes that represent keystrokes entered. It may be noted that even though the keyboard 165 is illustrated in this example as being connected to the PCI bus 142, other keyboard connection may also be used. For example, the keyboard 165 may be connected to a USB (universal serial bus) or a standard personal computer (PC) bus.

Keyboard

Figure 2A:
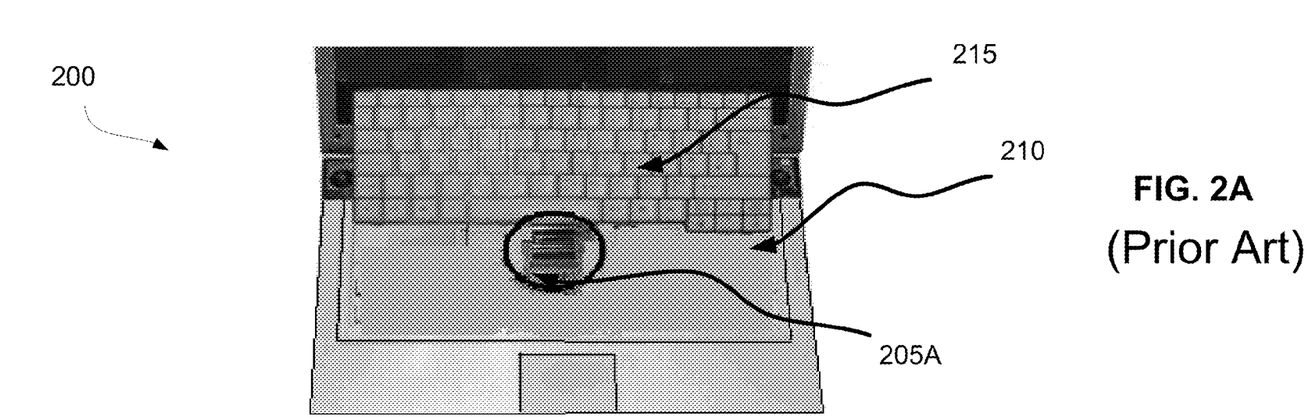
FIGS. 2A and 2B illustrate a simplified example of a keyboard assembly in a computer system.
Figure 2B:
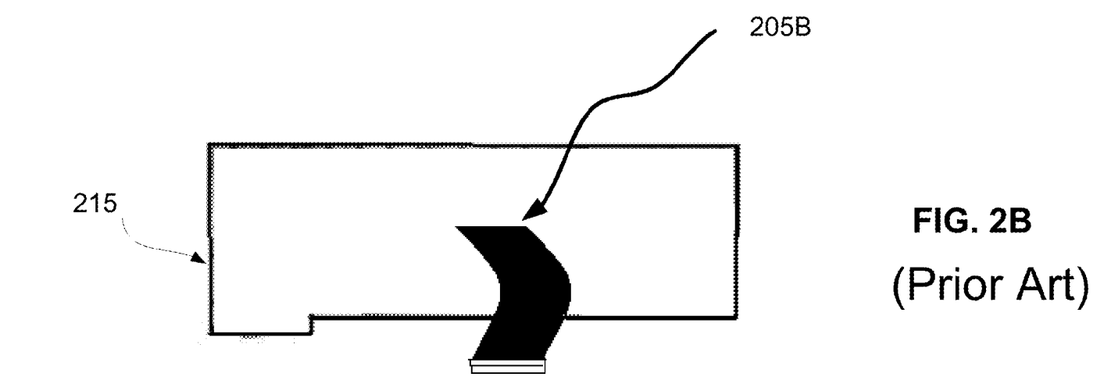

FIGS. 2A and 2B illustrate a simplified example of a keyboard assembly in a computer system. Computer system 200 includes a keyboard assembly which may include keyboard 215 on its front side (illustrated in FIG. 2A) and keyboard cable 205B on its backside (illustrated in FIG. 2B). The keyboard assembly is illustrated in the current example as having been lifted from a keyboard bay 210. The keyboard 215 may be fitted into the keyboard bay 210 via securing tongues (not shown) in various places. The keyboard 215 may also be secured to the keyboard bay 210 via mounting brackets and screws (not shown) in various places. It may be noted that different types of keyboard design may use different securing techniques at different locations of a keyboard.

The keyboard bay 210 may include an opening to expose an interface connector 205A. The interface connector 205A may be located on a system board (not shown) positioned underneath the keyboard bay 210. The keyboard cable 205B includes a connection end having multiple contact points (not shown) to connect the cable 205B to the interface connector 205A. The keyboard cable 205B is located generally toward the center of the backside of the keyboard 215. Other keyboard design may include a keyboard cable located toward the left or toward the right of the backside of the keyboard.

It may be noted that the dimensions of the keyboard 215 may be designed such that its length, width, and thickness fit into the keyboard bay 210. A keyboard used by a different computer manufacturer (or brand) or used in a different computer system by the same computer manufacturer may not fit the keyboard bay 210. Because of at least these differences and also lack of standardization, keyboard replacement is not as efficient and economical as desired.

Figure 3A:
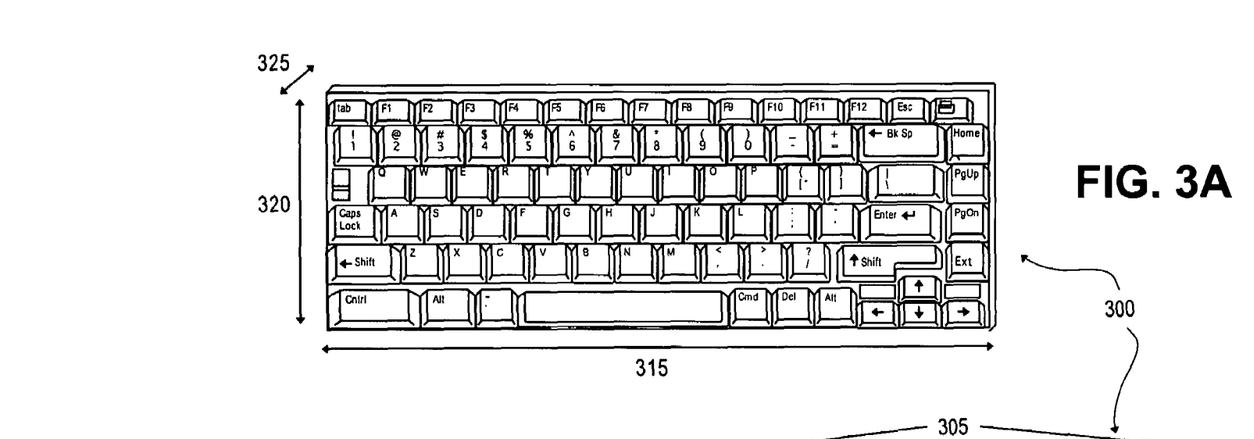
FIGS. 3A and 3B illustrate an example of a keyboard design that may be used interchangeably in computer systems, in accordance with some embodiments.
Figure 3B:
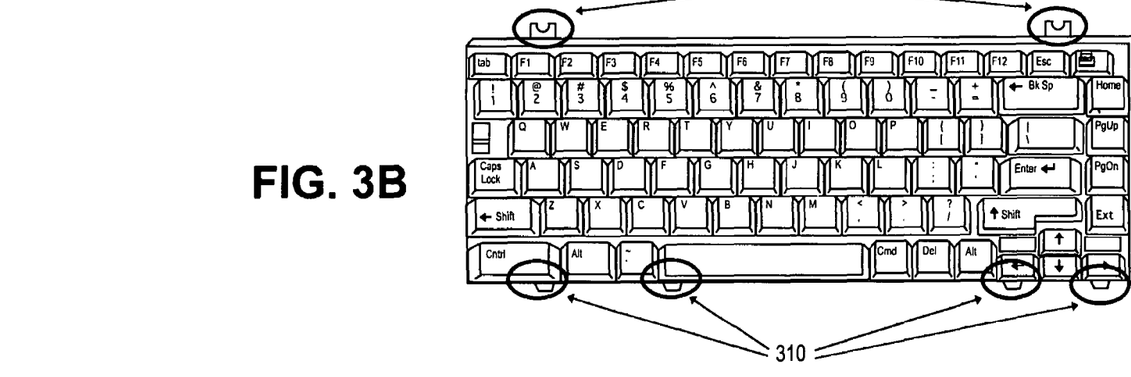

FIGS. 3A and 3B illustrate an example of a keyboard design that may be used interchangeably in computer systems, in accordance with some embodiments. Such a keyboard may be referred to herein as an interchangeable keyboard and may be designed for use in mobile computer systems. For some embodiments, the interchangeable keyboards may be designed to have common or standardized length, width and thickness. Referring to FIG. 3A, interchangeable keyboard 300 may be designed to have specific length 315, specific width 320, and specific thickness 325. The interchangeable keyboard 300 may fit into a keyboard bay (not shown) of different computer systems by the same manufacturer or by different manufacturers.

For some embodiments, an interchangeable keyboard may be designed to have standardized securing mechanisms. These securing mechanisms may be similar in size and may be placed in similar locations of the keyboard. Referring to the example in FIG. 3B, the securing mechanisms may include four securing tongues 310 evenly placed along a first long edge of the interchangeable keyboard 300. The securing mechanisms may also include two mounting brackets 305 placed near each end of a second long edge of the interchangeable keyboard 300. The mounting brackets 305 may be used in conjunction with securing screws (not shown) to secure the interchangeable keyboard 300 to an associated keyboard bay.

It may be noted that other dimensions, types of securing mechanisms and the number of securing mechanisms may also be used as long as the locations, the type of securing mechanisms, and the number of securing mechanisms remain consistent for all interchangeable keyboards. It may also be noted that there may be more than one interchangeable keyboard design. For example, there may be one interchangeable keyboard design for all small form factor mobile computer systems such as those having a 15" display screen. There may be another interchangeable keyboard design for all large form factor mobile computer systems such as those having a 17" display screen, and so on. Having the interchangeable keyboard design may enable keyboard cost and computer system cost to be reduced.

Control Device

FIGS. 4A-4D illustrate an example of a control device, in accordance with some embodiments. Keyboard 400 in this example may be an interchangeable keyboard, as described above. A control device may be used in conjunction with a keyboard to interact with applications running in a computer system. A control device may include audio features, joy stick features, telephony features, etc. The control device may be wired or wireless. The audio features may include microphone features, speakerphone features, etc. For example, the control device may be used to listen to music played by a music player application running in the associated computer system and via the wireless communication features. As another example, the control device may be used to control execution of an application running in the associated computer system.

Figure 4A:
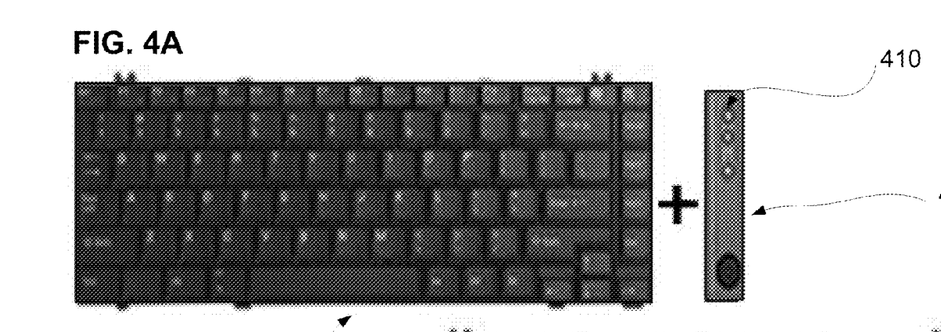

When the control device is a wired device (e.g., a finger print sensor), it may be located on the left side or on the right side of the standardized keyboard. For some embodiments, when the control device is a wired device, it may be designed with standardized connector type, electrical interface characteristics (e.g., USB interface, serial interface, etc.). It may also be designed with standardized cable length. This way, a system board designed may place the interface connector for the control device on the left side or on the right side of the system board and does not affect the operation or connection of the control device. Having the standardized cable length may enable the control device to reach the interface connector regardless of the location of the connector. Using these standardized features may enable the control devices to be used interchangeably across different computer system form factors from the same or different computer manufacturers. When the control device is a wireless device (e.g., joy stick, remote control, etc.), the control device may be placed into a slot (or bay) on the left, or on the right side of the keyboard. Referring to FIG. 4A, control device 405 is illustrated to be associated with an interchangeable keyboard 400. For some embodiments, control device 405 may be designed to have common or standardized dimensions (e.g., length, width and thickness). The control device 405 may be positioned adjacent to the interchangeable keyboard 400 in a slot next to the keyboard bay (not shown). The control device 405 may be placed right of the interchangeable keyboard 400 (illustrated in FIG. 4B), left of the interchangeable keyboard 400 (illustrated in FIG. 4C) or above the interchangeable keyboard 400 (illustrated in FIG. 4D).

Figure 4B:
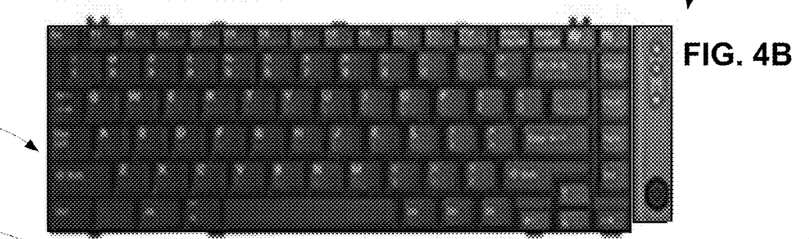
Figure 4C:
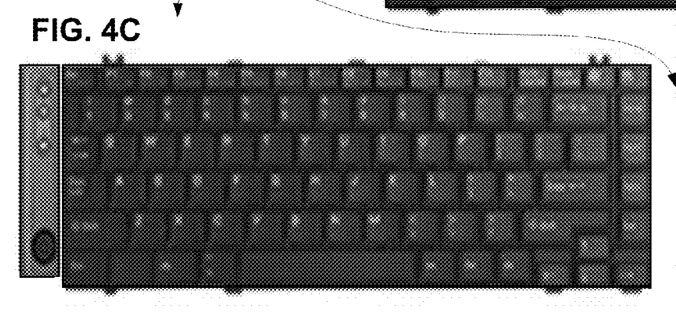
Figure 4D:
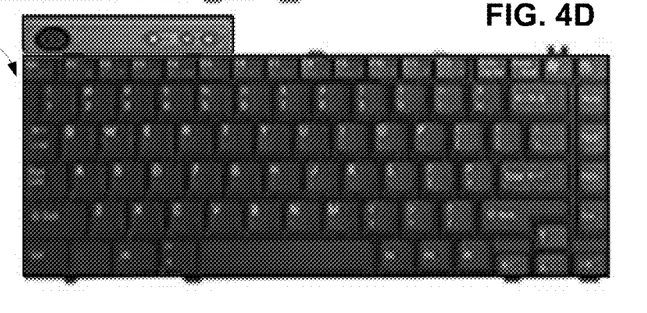

For some embodiments, the control device 405 may include a sensor (not shown) to automatically recognize its placement orientation and reconfigure its functions to adjust to the placement orientation. For example, control keys 410 on the control device 405 when used vertically as illustrated in FIG. 4B and FIG. 4C may behave the same. However, these control keys 410 may behave differently when used horizontally as illustrated in FIG. 4D. For example, a cursor control key (not shown) may move a cursor horizontally when used in the example illustrated in FIG. 4B may instead move the cursor vertically when used in the example illustrated in FIG. 4D. It may be noted that when the control devices in different computer systems have similar features, dimensions, a common electrical interface, interface connector and cable length, they may be used interchangeably.

Figure 5:
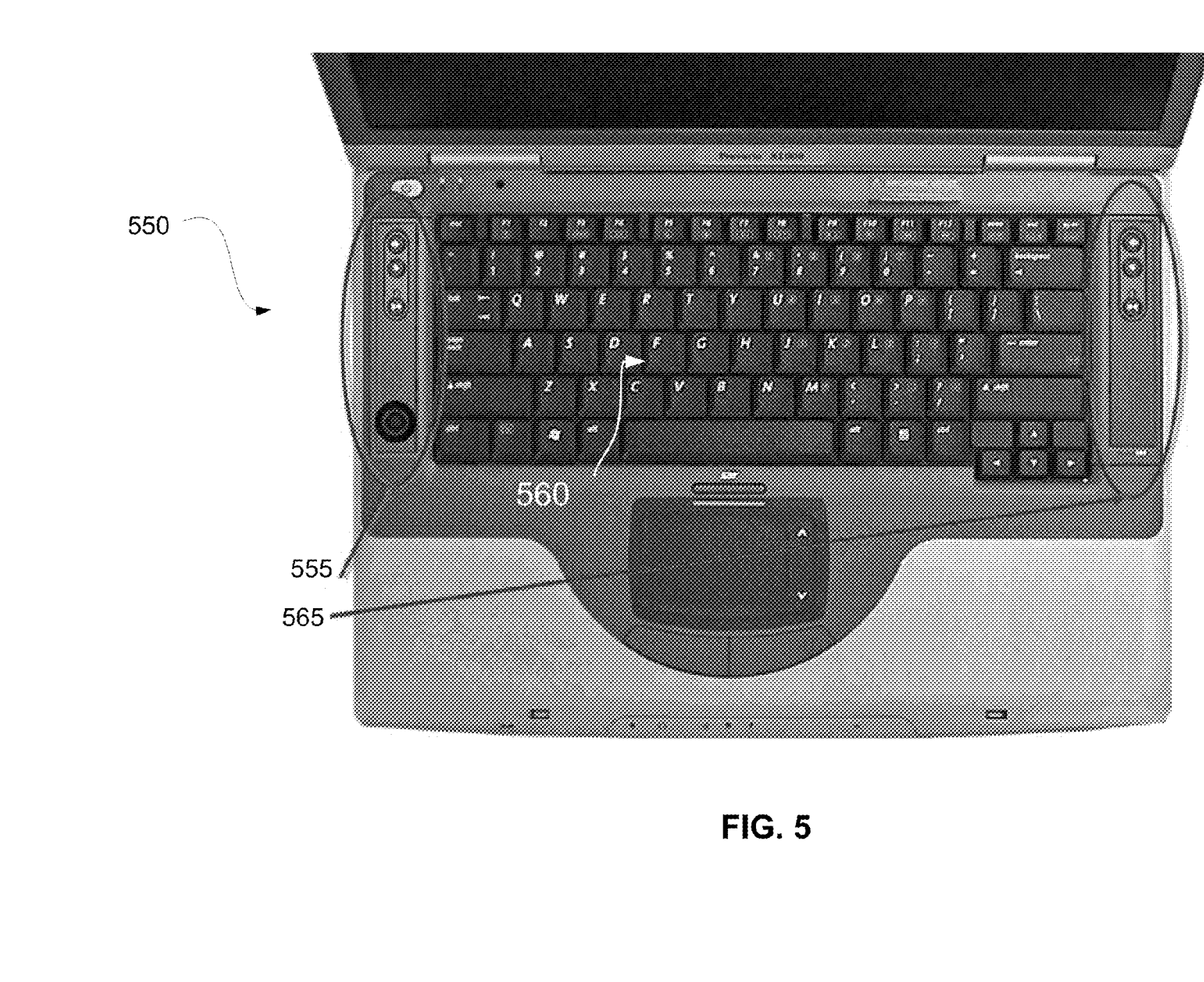
FIG. 5 illustrates an example of a computer system configured with an interchangeable keyboard and more than one control device, in accordance with one embodiment.

FIG. 5 illustrates an example of a computer system configured with an interchangeable keyboard and more than one control device, in accordance with one embodiment. In this example, computer system 550 includes two control devices 555 and 565, one to the right and the other to the left of the interchangeable keyboard 560. It may be noted that the two control devices 555 and 565 may include different features and may operate differently. It may also be noted that the two control devices 555 and 565 may have the same dimensions, a common electrical interface, interface connector and cable length and as such may switch their positions relative to the interchangeable keyboard 560 without significantly impacting their operations.

Keyboard Cable

Typically, a keyboard for a mobile computer system is manufactured and installed with a specific flex cable that must be attached to the system board via an interface connector within a narrow zone or area based on cable configuration. Some keyboards and flex cables are custom designed for specific computer platforms driving the interface connector to be specifically placed on the system board, as discussed in the example in FIG. 2B.

Figure 6A:
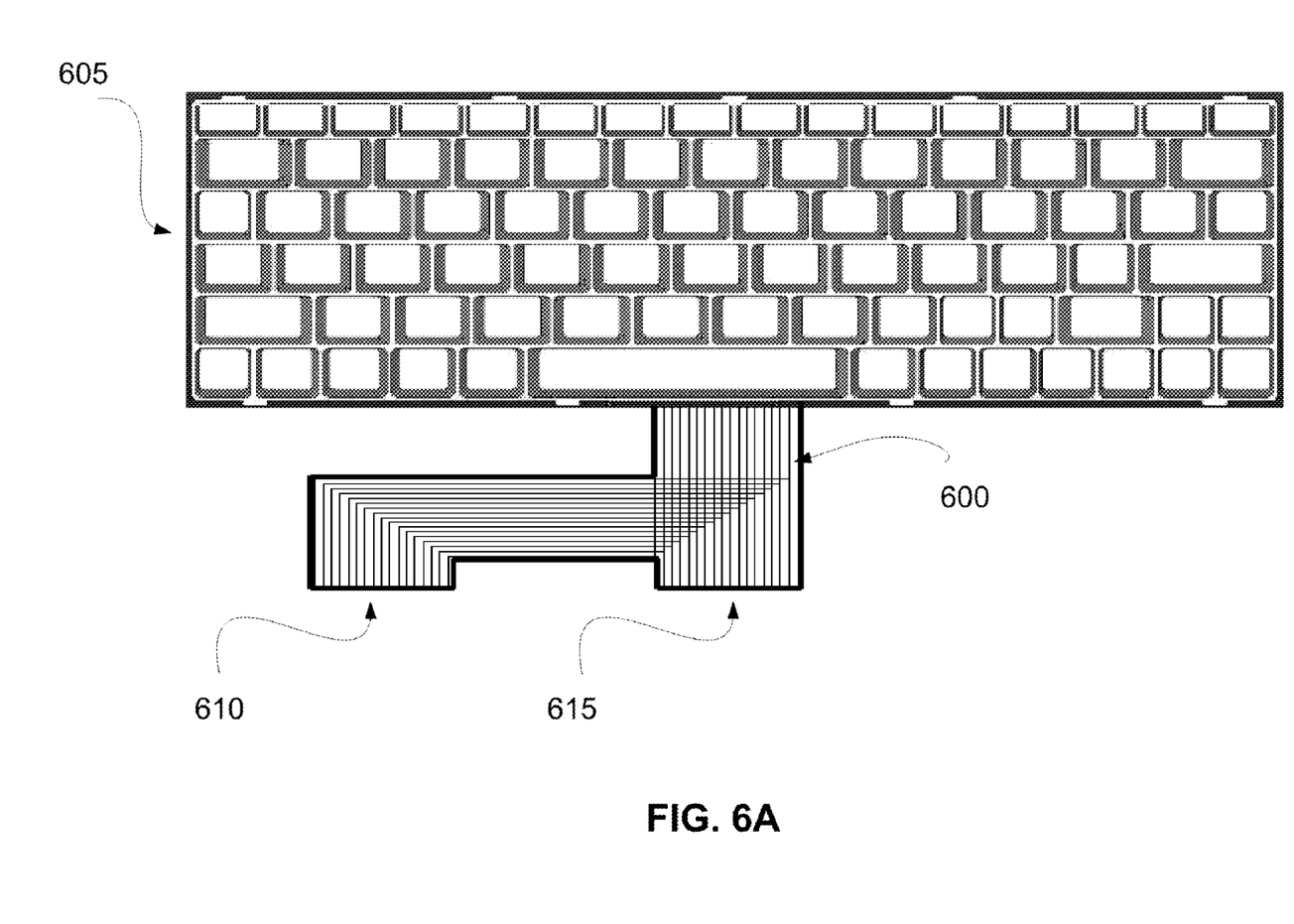
Figure 6B:
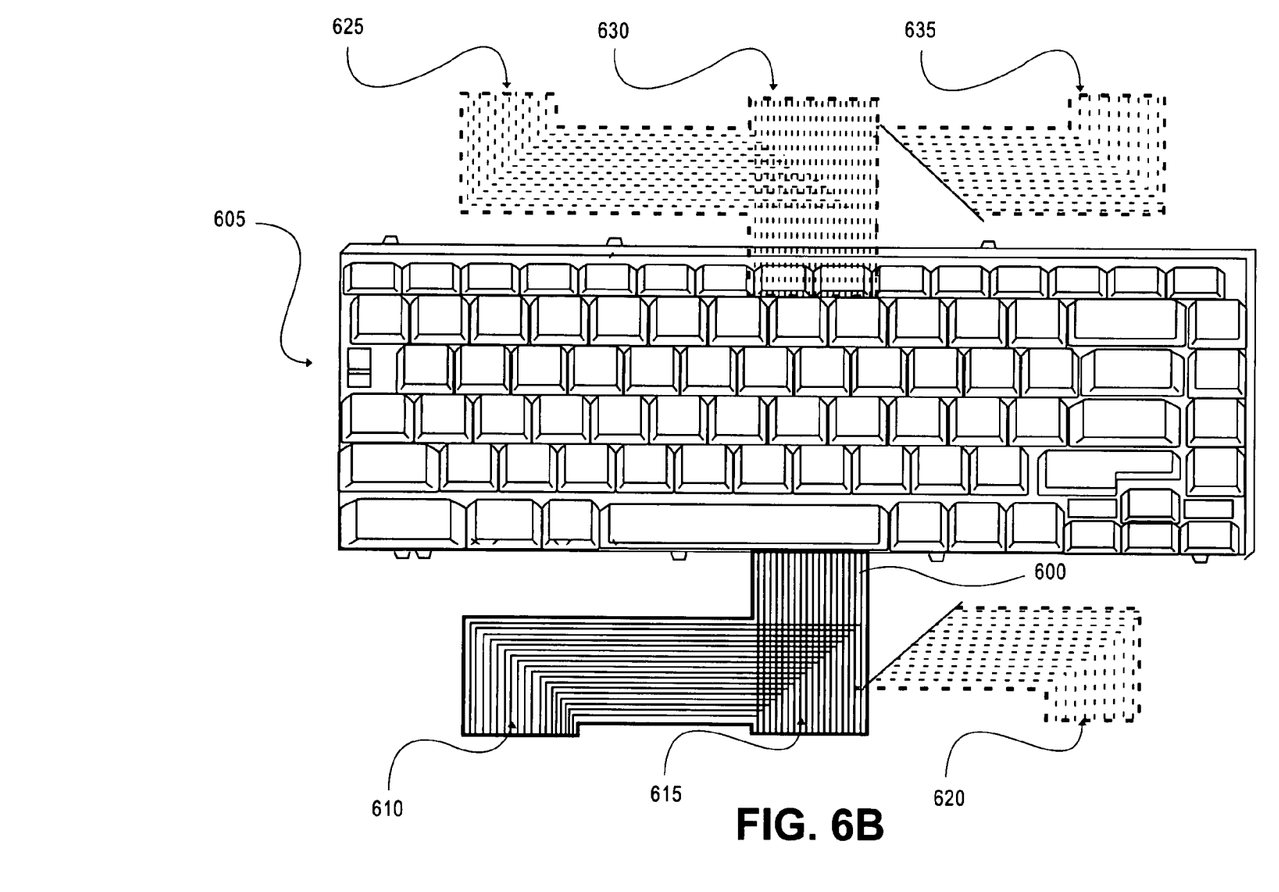

FIG. 6A illustrates an example of one implementation of an improved keyboard cable, in accordance with some embodiments. For some embodiments, a keyboard cable may include multiple connection ends. Each connection end may be used to accommodate an interface connector positioned in a different location in a keyboard bay. In the current example, keyboard cable 600 may be used with an interchangeable keyboard 605. Instead of the standard single connection end, the keyboard cable 600 may include two connection ends 610 and 615. The connection end 615 may be centrally located to accommodate an interface connector that is centrally located. The connection end 610 may be offset to the left or to the right side to accommodate an interface connector that is offset from a central area. The keyboard cable 600 may be sufficiently flexible to be directed in different angles thus may enable accommodating a wide range of interface connector locations. FIG. 6B illustrates examples of the flexibility of the keyboard cable 600. In this example, the keyboard cable 600 may be directed so that a connection end may be positioned at six different locations 610-635.

Figures 6C, 6D, 6E:
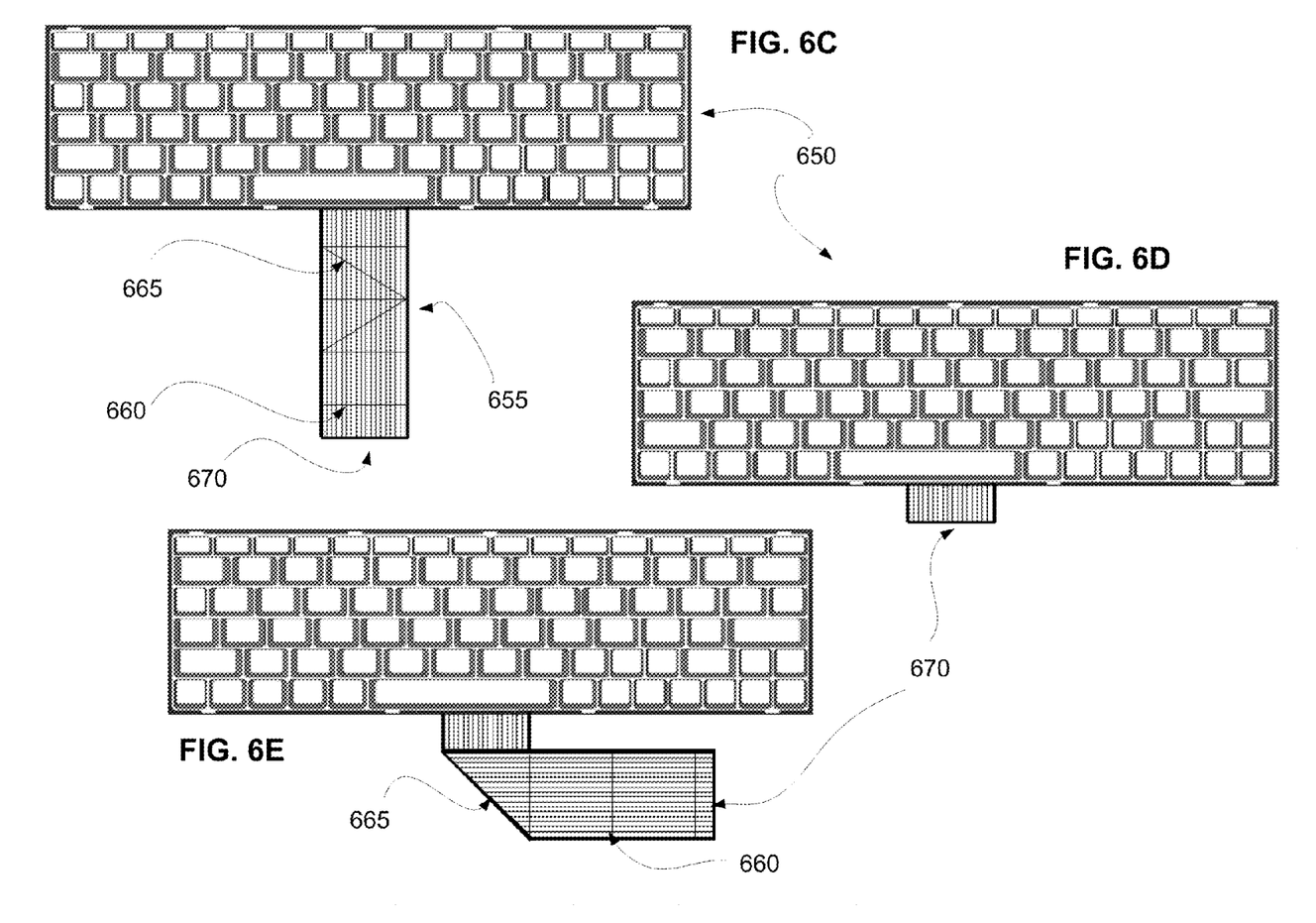

FIGS. 6C-6E illustrate another example of an improved keyboard cable, in accordance with some embodiments. For some embodiments, a keyboard cable may be folded to a compact size to accommodate a nearby interface connector, or it may be unfolded to extent its length to accommodate an interface connector at a distant location. Referring to FIG. 6C, keyboard cable 655 may be used with an interchangeable keyboard 650. The keyboard cable 655 may include one connection end. For some embodiments, the keyboard cable 655 may be folded in an angle along one or more diagonal edges 665. The diagonal edge 665 may be used to direct the keyboard cable 655 at an angle. For example, the diagonal edge 665 may be set at a 45 degrees angle so that the keyboard cable 655 may be folded to direct the connection end 670 to the right, as illustrated in FIG. 6E.

The keyboard cable 655 may also be folded along one or more straight edges 660. The straight edge 660 may be used to shorten or to extend the keyboard cable 655 vertically or horizontally, as illustrated in FIG. 6D. Using a combination of folds along the diagonal edge 665 and along the straight edge 660 may enable the keyboard cable 655 to be used with an interface connector positioned at different locations. It may be noted that the thickness of the keyboard cable 655 may need to be designed such that the keyboard cable 655 may fit between the bottom side of the keyboard 650 and the associated keyboard bay (not shown). The thickness of the keyboard cable 655 may affect how long it can be extended.

Figure 6F:
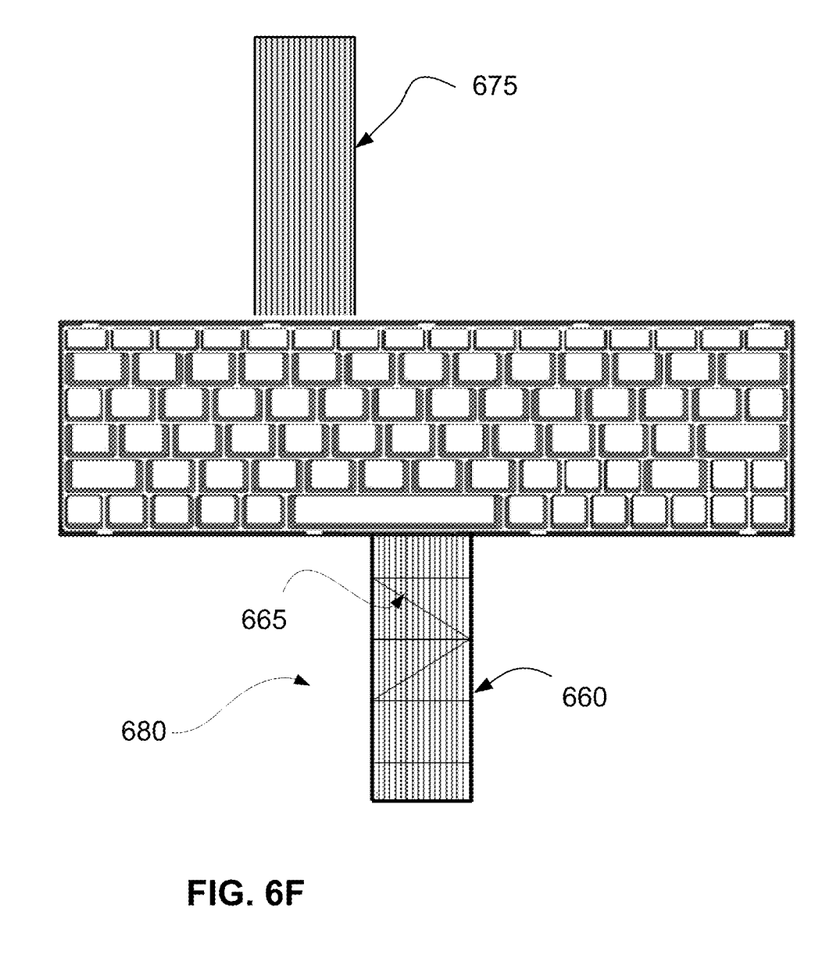

FIG. 6F illustrates an example of an improved keyboard cabling configuration, in accordance with some embodiments. For some embodiments, a keyboard cable may include two sections, each with own connection end. Referring to FIG. 6F, a keyboard cable may include a first cable section 680 and a second cable section 675. The first cable section 680 may be arranged as a foldable cable with one or more diagonal edges 665 and one or more straight edges 660. The second cable section 675 may be arranged as a flexible cable. Having a keyboard cable with multiple sections may provide additional cabling connection flexibility. For example, when implemented by an integrator, either the cable section 675 or the cable section 680 may be removed by a cutting process when unused. Alternatively, the unused cable section may be folded out of the way for final integration.

Process

Figure 7:
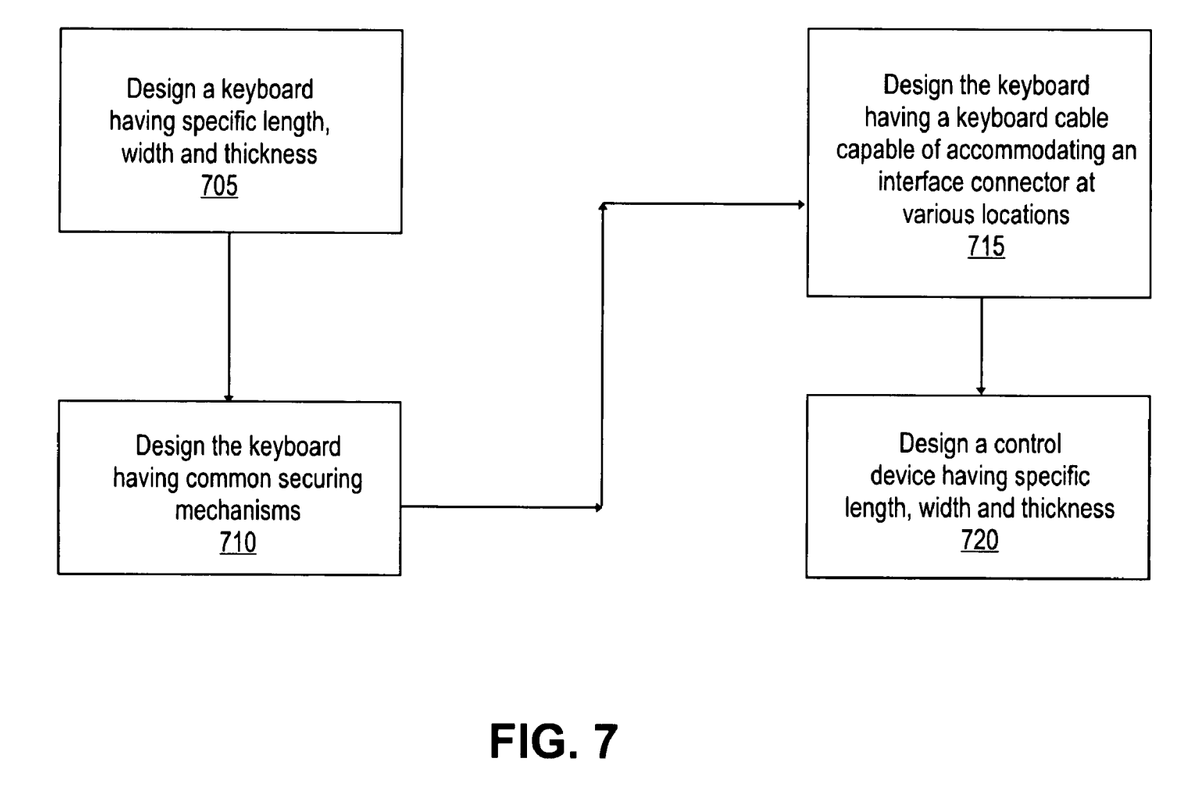
FIG. 7 is a block diagram illustrating an example of a process that may be used, in accordance with some embodiments.

FIG. 7 is a block diagram illustrating an example of a process that may be used, in accordance with some embodiments. This process relates to designing an interchangeable keyboard that may be used in different computer systems. At block 705, a keyboard may be designed to have a specific length, width and thickness. At block 710, the keyboard may be designed with specific securing mechanisms at specific places. The securing mechanisms may include securing brackets and securing tongues. At block 715, the keyboard may be used with a keyboard cable having multiple connection ends. Alternatively, the keyboard may be used with a foldable keyboard cable. This may enable the keyboard to connect to an interface connector via the keyboard cable at different places on a system board. At block 720, a control device may be designed to be used along with the keyboard. The control device may be designed to have a specific length, width and thickness. This may enable the control device to fit in a slot of the keyboard bay adjacent to the keyboard.

Although some embodiments of the present invention have been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   folding a keyboard cable along a first predefined straight edge and a first predefined diagonal edge to customize a length of the keyboard cable and to enable the keyboard cable to interface with an interface connector of a keyboard bay associated with a first mobile computer system or a second mobile computer system;
   coupling a keyboard to the interface connector of the keyboard bay associated with the first mobile computer system; and
   coupling a control device to be used in conjunction with the keyboard to the keyboard bay associated with the first mobile computer system, wherein the control device includes a sensor to automatically recognize placement orientation of the control device and reconfigure a function of the control device in accordance with the placement orientation.

2. The method of claim 1, wherein the first mobile computer system and the second mobile computer system are manufactured by one computer manufacturer.

3. The method of claim 1, wherein the first mobile computer system and the second mobile computer system are manufactured by different computer manufacturers.

4. The method of claim 1, further comprising decoupling the keyboard from the first mobile computer system, unfolding the keyboard cable along the first predefined diagonal edge and the first predefined straight edge, folding the keyboard cable along a second predefined diagonal edge and a second predefined straight edge, coupling the keyboard to the interface connector of the keyboard bay associated with a second mobile computer system.

5. A system, comprising:
   a keyboard cable configured to be folded or unfolded along one or more predefined straight edges and one or more predefined diagonal edges to customize a length of the keyboard cable and to enable the keyboard cable to interface with an interface connector of a keyboard bay associated with a plurality of mobile computer systems;
   a system board having an interface connector to connect to the keyboard cable;
   a keyboard coupled to the keyboard cable, the keyboard designed to have a first set of standardized dimensions, the keyboard adaptable to be used in any one of two or more different mobile computer systems, the keyboard cable adaptable to be connected to the interface connector at different locations relative to a bottom side of the keyboard; and
   a first control device used in conjunction with the keyboard configured to include a sensor to automatically recognize placement orientation of the control device and reconfigure a function of the control device in accordance with the placement orientation.

6. The system of claim 5, wherein the keyboard is adaptable to be used in any one of two or more different mobile computer systems having same brand.

7. The system of claim 5, wherein the keyboard is adaptable to be used in any one of two or more different mobile computer systems having different brands.

8. The system of claim 5, wherein the keyboard cable is foldable diagonally to accommodate the interface connector at different locations.

9. The system of claim 5, wherein the first control device is to be designed with a second set of standardized dimensions, electrical interface, connector and cable length.

10. The system of claim 9, further comprising:
    a second control device coupled to the keyboard and to the first control device, the second control device designed with the second set of standardized dimensions and configured to operate in conjunction with the keyboard in any one of two or more different mobile computer systems.

11. The system of claim 9, wherein the first set of standardized dimensions or the second set of standardized dimension includes length, width and thickness, and wherein the keyboard is to be further designed with standardized types of securing mechanisms at specific places relative to the keyboard.

12. A keyboard assembly, comprising:
    a keyboard designed with standardized length, width and thickness and to be used in a first mobile computer system manufactured by a first computer manufacturer or in a second mobile computer system manufactured by a second computer manufacturer;
    a keyboard cable coupled to the keyboard and designed to accommodate an interface connector positioned at any location relative to a bottom side of the keyboard and configured to be folded or unfolded along one or more predefined straight edges and one or more predefined diagonal edges to customize a length of the keyboard cable and to enable the keyboard cable to interface with an interface connector of a keyboard bay associated with the first mobile computer system or the second mobile computer system; and
    a control device used in conjunction with the keyboard configured to include a sensor to automatically recognize placement orientation of the control device and reconfigure a function of the control device in accordance with the placement orientation.

13. The keyboard assembly of claim 12, wherein the keyboard is further to be used in a third mobile computer system manufactured by the first computer manufacturer.

14. The keyboard assembly of claim 13, wherein the first mobile computer system and the third mobile computer system have different form factors.

15. The keyboard assembly of claim 12, wherein the keyboard cable is a foldable cable capable of being folded or unfolded along one or more diagonal edges and one or more straight edges to accommodate the interface connector positioned at a location relative to the bottom side of the keyboard.

16. The keyboard assembly of claim 12, wherein the keyboard is to be designed with standardized types of securing mechanisms at specific places relative to the keyboard.

* * * * *

UNITED STATES PATENT AND TRADEMARK OFFICE
CERTIFICATE OF CORRECTION

| | | |
|---|---|---|
| PATENT NO. | : 7,672,120 B2 | Page 1 of 2 |
| APPLICATION NO. | : 11/394613 | |
| DATED | : March 2, 2010 | |
| INVENTOR(S) | : Ed H. Kohlman et al. | |

It is certified that error appears in the above-identified patent and that said Letters Patent is hereby corrected as shown below:

Delete Drawing Sheet 1 of 10 and substitute therefore the attached Drawing Sheet 1 of 10.

Signed and Sealed this

Thirty-first Day of May, 2011

David J. Kappos
*Director of the United States Patent and Trademark Office*

FIG. 1